(12) United States Patent
Shimizu et al.

(10) Patent No.: US 7,883,801 B2
(45) Date of Patent: Feb. 8, 2011

(54) ELECTROLYTE FOR RECHARGEABLE LITHIUM BATTERY, AND RECHARGEABLE LITHIUM BATTERY INCLUDING THE SAME

(75) Inventors: Ryuichi Shimizu, Yokohama (JP); Sang-Woog Ryu, Suwon-si (KR); Sung-Soo Kim, Suwon-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 970 days.

(21) Appl. No.: 11/599,620

(22) Filed: Nov. 15, 2006

(65) Prior Publication Data

US 2007/0122717 A1    May 31, 2007

(30) Foreign Application Priority Data

Nov. 15, 2005    (JP) .............................. 2005-330004
Nov. 15, 2006    (KR) ...................... 10-2006-0112837

(51) Int. Cl.
*H01M 6/16* (2006.01)
(52) U.S. Cl. ................. 429/324; 429/326; 429/330
(58) Field of Classification Search ................ 429/324, 429/326, 330
See application file for complete search history.

(56) References Cited

U.S. PATENT DOCUMENTS

| | | | |
|---|---|---|---|
| 4,970,559 A * | 11/1990 | Miyabayashi | ............... 399/324 |
| 5,344,726 A | 9/1994 | Tanaka et al. | |
| 5,478,672 A | 12/1995 | Mitate | |
| 5,885,733 A | 3/1999 | Ohsawa et al. | |
| 5,888,430 A | 3/1999 | Wakayama et al. | |
| 6,124,062 A | 9/2000 | Horie et al. | |
| 6,436,577 B1 | 8/2002 | Kida et al. | |
| 6,541,156 B1 | 4/2003 | Fuse et al. | |
| 6,733,922 B2 | 5/2004 | Matsubara et al. | |
| 6,783,897 B2 | 8/2004 | Kang et al. | |
| 6,872,493 B2 | 3/2005 | Yamada et al. | |
| 6,884,270 B2 | 4/2005 | Yoshino et al. | |
| 6,887,619 B2 | 5/2005 | West et al. | |
| 7,351,501 B2 * | 4/2008 | Jung et al. | .................. 429/302 |
| 7,459,239 B2 * | 12/2008 | Kashida et al. | ............. 429/302 |
| 7,588,859 B1 * | 9/2009 | Oh et al. | ...................... 429/188 |
| 7,618,678 B2 | 11/2009 | Mao et al. | |
| 2002/0028388 A1 | 3/2002 | Lee | |
| 2002/0160256 A1 | 10/2002 | Kami et al. | |

(Continued)

FOREIGN PATENT DOCUMENTS

EP    0581296 A2    2/1994

(Continued)

OTHER PUBLICATIONS

The Office Action (Paper No. 20100525) mailed on Jun. 10, 2010 of the related U.S. Appl. No. 11/614,374.

(Continued)

*Primary Examiner*—Melvin C Mayes
*Assistant Examiner*—Melissa Stalder
(74) *Attorney, Agent, or Firm*—Robert E. Bushnell, Esq.

(57) ABSTRACT

An electrolyte for a rechargeable lithium battery according to one embodiment of the present invention includes a modified polyether silicone oil, a carbonate, and a lithium salt. The electrolyte has improved thermal stability and lithium ion conductivity.

35 Claims, 3 Drawing Sheets

U.S. PATENT DOCUMENTS

| | | |
|---|---|---|
| 2004/0170816 A1 | 9/2004 | Watanabe et al. |
| 2004/0197668 A1 | 10/2004 | Jung et al. |
| 2004/0214090 A1 | 10/2004 | West et al. |
| 2005/0170254 A1 | 8/2005 | West et al. |
| 2006/0008706 A1 | 1/2006 | Yamaguchi et al. |
| 2007/0122717 A1 | 5/2007 | Shimizu et al. |
| 2007/0148543 A1 | 6/2007 | Takamuku et al. |
| 2007/0178375 A1 | 8/2007 | Kobayashi et al. |

FOREIGN PATENT DOCUMENTS

| | | |
|---|---|---|
| JP | 05286763 | 11/1993 |
| JP | 06-096759 | 4/1994 |
| JP | 08-078053 | 3/1996 |
| JP | 10154499 | 6/1998 |
| JP | 11-213042 | 8/1999 |
| JP | 11-214032 | 8/1999 |
| JP | 11273732 | 10/1999 |
| JP | 11329392 | 11/1999 |
| JP | 2000-058123 | 2/2000 |
| JP | 2002255529 | 9/2002 |
| JP | 2003142157 | 5/2003 |
| JP | 2003229019 | 8/2003 |
| JP | 2005071772 | 3/2005 |
| JP | 2006066095 | 3/2006 |
| KR | 1020000076049 A | 12/2000 |
| KR | 10-2001-0024400 | 3/2001 |
| KR | 10-2004-0065152 | 7/2004 |
| KR | 1020040065152 A | 7/2004 |
| KR | 1020050052217 A | 6/2005 |
| KR | 10-2006-0048753 | 5/2006 |
| KR | 10-2007-0010373 | 1/2007 |
| WO | 03083974 A1 | 10/2003 |

OTHER PUBLICATIONS

The Office Action (Paper No. 20100904) mailed on Sep. 13, 2010 of the related U.S. Appl. No. 11/177,919.

The Office Action (Paper No. 20091207) mailed on Dec. 23, 2010 of the related U.S. Appl. No. 11/177,919.

The Office Action (Paper No. 20090630) mailed on Jul. 6, 2010 of the related U.S. Appl. No. 11/177,919.

The Office Action (Paper No. 20100525) mailed on Jun. 18, 2010 of the related U.S. Appl. No. 11/642,957.

The Office Action (Paper No. 20091115) mailed on Dec. 1, 2010 of the related U.S. Appl. No. 11/642,957.

The Office Action (Paper No. 20101026) mailed on Nov. 16, 2010 of the related U.S. Appl. No. 11/614,374.

\* cited by examiner

ELECTROLYTE FOR RECHARGEABLE LITHIUM BATTERY, AND RECHARGEABLE LITHIUM BATTERY INCLUDING THE SAME

CROSS-REFERENCES TO RELATED APPLICATIONS

This application claims priority to and the benefit of Japanese Application No. 2005-330004 filed with the Japanese Patent Office on Nov. 15, 2005, and Korean Patent Application No. 10-2006-0112837 filed with the Korean Intellectual Property Office on Nov. 15, 2006, the entire contents of which are incorporated herein by reference.

BACKGROUND OF THE INVENTION (a) Field of the Invention

The present invention relates to an electrolyte for a rechargeable lithium battery and a rechargeable lithium battery including the same. More particularly, the present invention relates to an electrolyte for a rechargeable lithium battery having excellent thermal stability and ion conductivity, and a rechargeable lithium battery including the same.

(b) Description of the Related Art

Conventional rechargeable lithium batteries have used a mixed electrolyte including cyclic esters such as ethylene carbonate, propylene carbonate, and so on, linear esters such as dimethyl carbonate, ethyl propionate, and so on, and cyclic ethers such as tetrahydrofuran. However, the linear esters or cyclic ethers have a low flash point, and therefore the conventional electrolyte including the linear esters or cyclic ethers in a large volume % has a problem of low thermal stability. Japanese Patent laid-open Nos. 1996-78053, 1999-214032, and 2000-58123 discloses a silicone oil as a solvent to provide a thermally stable and environmentally-friendly electrolyte.

The silicone oil used in the electrolytes disclosed in the Japanese Patent laid-open Nos. 1996-78053, 1999-214032, and 2000-58123 has good thermal stability, but a rechargeable lithium battery using the electrolyte has insufficient ion conductivity.

SUMMARY OF THE INVENTION

One embodiment of the present invention provides an excellent electrolyte for a rechargeable lithium battery having thermal stability and lithium ion conductivity, and a rechargeable lithium battery including the same.

According to an embodiment of the present invention, provided is an electrolyte for a rechargeable lithium battery that includes a modified polyether silicone oil, carbonates, and lithium salts. The electrolyte is a non-aqueous electrolyte.

The polyether modified silicone oil may be at least one selected from the group consisting of the compounds of the following Formulas 1 to 5, and combinations thereof.

Formula 1

Formula 2

Formula 3

Formula 4

Formula 5

In the above Formulas 1 to 5, k ranges from 1 to 9, l ranges from 0 to 3, m ranges from 0 to 1, n ranges from 1 to 2, R is either of $CH_3$ or $C_6H_5$, and z is either of $CH_3$ or $C_2H_5$.

The electrolyte including the modified polyether silicone oil compound selected from the group consisting of the compounds of the above Formulas 1 to 5 and combinations thereof has improved thermal stability and high lithium ion conductivity.

The electrolyte of the rechargeable lithium battery further includes a carbonate-modified silicone oil. The polyether modified silicone oil and carbonate-modified silicone oil has a flash point of more than or equal to 120° C. According to one embodiment, the oil has a flash point of more than or equal to 160° C. When the flash point is more than 120° C., the silicone oil cannot be ignited at a high temperature, and electrolyte thermal stability can be improved.

The carbonates may be selected from the group consisting of cyclic carbonates, linear carbonates, and combinations thereof. The cyclic carbonates may further include fluorinated cyclic carbonates. The cyclic carbonate may be included in an amount of 30 to 95 volume % based on the total volume of the electrolyte.

The lithium salt includes at least one selected from the group consisting of $LiPF_6$, $LiBF_4$, $Li[N(SO_2C_2F_6)_2]$, Li[B $(OCOCF_3)_4]$, $Li[B(OCOC_2F_5)_4]$, $LiPF_6$, $Li[N(SO_2C_2F_5)_2]$, and combinations thereof. The lithium salt is included at a concentration of 0.5 to 2.0 mol/L.

According to another embodiment, a rechargeable lithium battery including a positive electrode, a negative electrode, and the above electrolyte is provided.

DETAILED DESCRIPTION OF THE EMBODIMENTS

An exemplary embodiment of the present invention will hereinafter be described in detail with reference to the accompanying drawings.

The rechargeable lithium battery according to one embodiment includes a positive electrode, a negative electrode, and an electrolyte. The electrolyte includes a polyether-modified silicone oil selected from the group consisting of the compounds of the above Formulas 1 to 5, and combinations thereof, carbonates, and lithium salts. In the above Formulas 1 to 5, k ranges from 1 to 9, l ranges from 0 to 3, m ranges from 0 to 1, n ranges from 1 to 2, R is either of $CH_3$ or $C_6H_5$, and z is either of $CH_3$ or $C_2H_5$.

The lithium salts are dissolved in a mixed solvent of the modified polyether silicone oil and carbonates. The carbonate may be selected from the group consisting of cyclic carbonates, linear carbonates, and combinations thereof. The cyclic carbonates may further fluorinated cyclic carbonates.

The electrolyte may be a gel electrolyte impregnated in a polymer. Examples of the polymer include polyethylene oxide (PEO), polypropylene oxide (PPO), polyacrylonitrile (PAN), polyvinylidene fluoride (PVDF), polymethacrylate (PMA), polymethylmethacrylate (PMMA), or copolymers thereof.

As in the above Formulas 1 to 5, the modified polyether silicone oil includes one or two polyether chains $((—(CH_2)_l—(CH(CH_3)CH_2)_m—O—(C_2H_4O)_n—Z)$ or $(—(CH_2)_l—(CH(CH_3)CH_2)_m—O—(C_2H_4O)_n—(CH_2CH(CH_3))_m—(CH_2)_l)—)$ bound with a linear poly siloxane chain $(SiR_2—O—(SiR_2O—)_k—SiR_2)$ or cyclic polysiloxane. The modified polyether silicone oil has high thermal stability due to a linear or cyclic poly siloxane chain. The oxygens of the ether bonds of the polyether chain can be solvated with lithium ions to improve ion conductivity of the electrolyte.

The modified polyether silicone oil heightens a flash point of the electrolyte to improve thermal stability as well as lithium ion conductivity of the electrolyte. When the modified polyether silicone oil is applied for an electrolyte of a rechargeable lithium battery, a rechargeable lithium battery with excellent high temperature stability and high efficiency can be provided.

The electrolyte of the rechargeable lithium battery further includes a carbonate-modified silicone oil. The electrolyte for a rechargeable lithium battery including the carbonate-modified silicone oil has more improved thermal stability and lithium ion conductivity due to interaction between the modified polyether silicone oil and the carbonate-modified silicone oil. For the carbonate-modified silicone oil, commercially available X-22-1891-1 or X-22-1891-3 (Shin-Etsu Chemical Co. Ltd.).

The polyether-modified silicone oil and carbonate-modified silicone oil have a flash point of more than or equal to 120° C. According to one embodiment, the oil has a flash point of more than or equal to 160° C. When the silicone oil flash point is more than 120° C., the electrolyte flash point can be heightened and the electrolyte thermal stability can be improved.

In the above Formulas 1 to 5, k ranges from 1 to 9, l ranges from 0 to 3, m ranges from 0 to 1, n ranges from 1 to 2, R is either of $CH_3$ or $C_6H_5$, and z is either of $CH_3$ or $C_2H_5$.

When K is more than 9, thermal stability can be improved, but viscosity increases and thereby lithium ions cannot be dissolved well resulting in deterioration of ion conductivity. When K is less than 1, the silicone oil can be decomposed easily.

When l is more than 3, the electrolyte viscosity increases and ion conductivity may be deteriorated.

When m is more than 1, the polyether chain is lengthened to increase viscosity and deteriorate ion conductivity.

When n is less than 1, the polyether chain linked to the polysiloxane chain may not exist, and compatibility with cyclic carbonates is deteriorated. On the contrary, when n is more than 2, the polyether chain is lengthened to increase viscosity and deteriorate ion conductivity.

When R is either of $CH_3$ or $C_6H_5$, and z is either of $CH_3$ or $C_2H_5$, the modified polyether silicone oil may be easily synthesized.

Examples of the cyclic carbonates include at least one compound selected from the group consisting of ethylene carbonate, butylene carbonate, propylene carbonate, γ-butyrolactone, and combinations thereof. Since the cyclic carbonate is easily solvated with lithium ions, ion conductivity of the electrolyte can be improved.

The linear carbonate, for example, includes at least one selected from the group consisting of dimethylcarbonate, methylethylcarbonate, diethylcarbonate, and combinations thereof. Since the linear carbonate has low viscosity, it can reduce viscosity of the non-aqueous electrolyte and increase ion conductivity. When the linear carbonate is added in an excessive amount, the flash point of the electrolyte may be decreased due to its low flash point. Therefore, it should not be used in an excessive amount.

The fluorinated cyclic carbonate includes fluorinated ethylene carbonate or monofluoroethylene carbonate. The fluorinated cyclic carbonate can improve inflammability of the electrolyte and thereby improve safety of the rechargeable lithium battery. The fluorinated cyclic carbonate forms a passivation film on the surface of the negative electrode. The passivation film suppresses electrolyte decomposition and also improves cycle characteristics of the rechargeable lithium battery. As the electrolyte decomposition is suppressed, less decomposition gases are generated.

The lithium salt includes at least one selected from the group consisting of $LiPF_6$, $LiBF_4$, $Li[N(SO_2C_2F_6)_2]$, $Li[B(OCOCF_3)_4]$, $Li[B(OCOC_2F_5)_4]$, $LiPF_6$, $Li[N(SO_2C_2F_5)_2]$, and combinations thereof. Since Si—O linkage of the modified polyether silicone oil may be broken by the decomposition of $LiPF_6$, $Li[N(SO_2C_2F_5)_2]$ may be suitable for the lithium salt.

The lithium salt may be included in a concentration of 0.5 mol/L to 2.0 mol/L based on the total concentration of the non-aqueous electrolyte. The lithium salt improves ion conductivity of the electrolyte.

The modified polyether silicone oil may be included in an amount of 1 volume % to 70 volume % based on the total volume of the electrolyte. According to one embodiment, the modified polyether silicone oil may be included in an amount of 5 volume % to 50 volume %. When the silicone oil is included in an amount of less than 1 volume %, the electrolyte flash point cannot be increased. When it is included in an amount of more than 70 volume %, electrolyte viscosity may be increased and thereby ion conductivity may be deteriorated.

The cyclic carbonate content may range from 30 volume % to 95 volume %. According to one embodiment, it may range from 50 volume % to 90 volume %. When the cyclic carbonate content is less than 30 volume %, ion conductivity may be deteriorated, while when it is more than 95 volume %, electrolyte viscosity increases and thereby ion conductivity may be deteriorated.

When the electrolyte includes the linear carbonate, the linear carbonate content may range 5 volume % to 70 volume %. According to one embodiment, it may range from 10 volume % to 65 volume %. When the linear carbonate content is less than 5 volume %, the linear carbonate addition effect may be negligible. When it is more than 70 volume %, relative contents of the cyclic carbonate and silicone oil are decreased resulting in a decrease of electrolyte flash point.

When the electrolyte includes a fluorinated cyclic carbonate, the fluorinated cyclic carbonate content may range from 0.1 volume % to 25 volume %. According to one embodiment, it may range from 0.5 volume % to 10 volume %. When the fluorinated cyclic carbonate content is less than 0.1 volume %, a passivation film on a surface negative electrode is not complete and thereby electrolyte decomposition cannot be suppressed. When it is more than 25 volume %, electrolyte viscosity increases and thereby ion conductivity may be deteriorated.

The modified polyether silicone oil may be obtained by reacting polyether compounds including double bonds such as $CH_2=CH-$ with polysiloxane where a part of R groups are substituted with hydrogen.

The modified polyether silicone oil may include Pt (platinum) as a catalyst component or butylated hydroxyl toluene (BHT) as a polymerization inhibitor in an amount of several to scores of ppm. Since the Pt or BHT has a bad effect on cycle characteristics, it is preferable to remove these materials. According to one embodiment, the modified polyether silicone oil may include Pt in an amount of less than 5 ppm, or BHT in an amount of less than 60 ppm. It is advantageous that the Pt or BHT is included under a detectable amount.

According to another embodiment, a rechargeable lithium battery including a positive electrode, a negative electrode, and the above electrolyte is provided.

An exemplary embodiment of the present invention will hereinafter be described in detail with reference to the accompanying drawings so that the skilled person in the art can implement the present invention.

Figure 1:
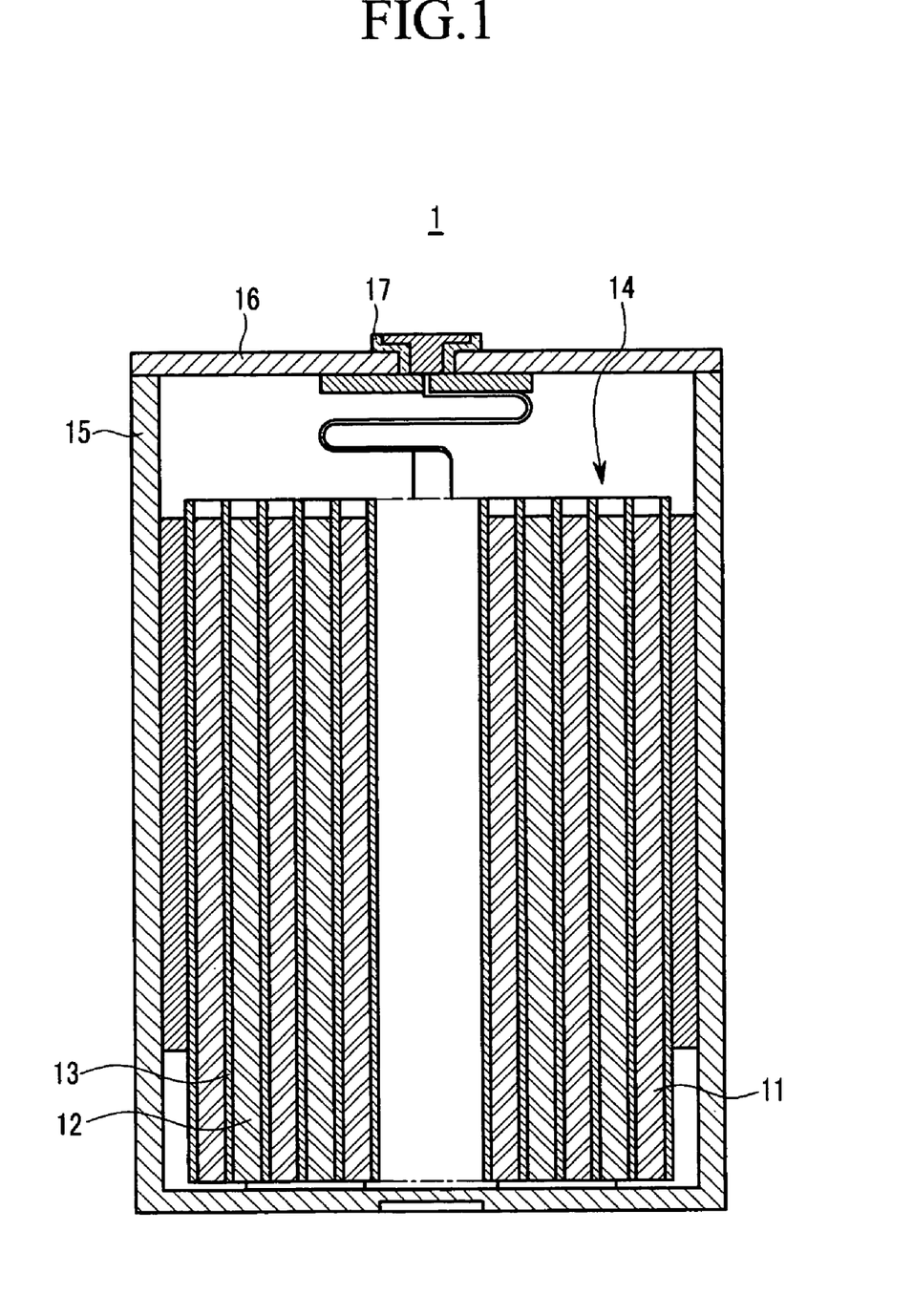
FIG. 1 is a schematic cross-sectional view of a rechargeable lithium battery according to one embodiment.

FIG. 1 is a schematic cross-sectional view of a rechargeable lithium battery according to one embodiment.

Referring to FIG. 1, the rechargeable lithium battery 1 includes the electrode assembly 14 including the positive electrode 11, the negative electrode 12, and the separator 13 between the positive electrode 11 and the negative electrode 12, and housed in the case 15. The rechargeable lithium battery 1 has a structure where electrolyte is provided through the upper part of the case 15 that is sealed with a cap plate 16 and a gasket 17.

The positive electrode may be formed in a sheet or disk shape by mixing positive active material powders, a binder such as polyvinylidene fluoride, and a conductive agent such as carbon black. The positive active material powder may be formed in a sheet or disk shape and stacked on a metal current collector.

The positive active material may include a composite oxide including an element selected from the group consisting of cobalt, manganese, nickel, and combinations thereof, and lithium. Examples of the positive active material include at least one selected from the group consisting of $LiMn_2O_4$, $LiCoO_2$, $LiNiO_2$, $LiFeO_2$, $V_2O_5$, and combinations thereof. A compound being capable of intercalating and deintercalating lithium ions, such as TiS, MoS, an organic disulfide compound, an organic polysulfide compound, and so on may also be used.

The separator may be a known separator such as a porous polypropylene film, a porous polyethylene film, and so on.

The negative electrode can be formed, for example, in a sheet or disk shape using a mixture of a negative active material powder that is capable of intercalating and deintercalating lithium ions, and a binder such as polyvinylidene fluoride. The negative electrode may include a conductive agent such as carbon black as well as the negative active material powder and the binder such as polyvinylidene fluoride. The negative active material powder may be formed in a sheet or disk shape and stacked on a metal current collector. The negative active material may include carbonaceous materials such as artificial graphite, natural graphite, graphitizable carbon fiber, graphitizable mesocarbon microbeads, amorphous carbon, and so on. For the negative active material, a metal material being capable of alloying with lithium, or a composite material of a metal material and a carbonaceous material may also be used. Non-limiting examples of the metal being capable of alloying with lithium includes Si, Al, Sn, Pb, Zn, Bi, In, Mg, Ga, Cd, Si alloys, Sn alloys, or Al alloys. For the negative active material, a lithium metal foil may also be used.

The electrolyte of the rechargeable lithium battery includes the modified polyether silicone oil to improve electrolyte thermal stability and high-temperature characteristics and heat resistance of the rechargeable lithium battery. The silicone oil does not deteriorate ion conductivity but improves high-rate discharge characteristics of the rechargeable lithium battery.

The following examples illustrate the present invention in more detail. However, it is understood that the present invention is not limited by these experimental examples.

EXAMPLE 1

A solution was prepared by mixing $LiPF_6$ in a concentration of 1.3 mol/L with a mixing solvent of diethyl carbonate (DEC) and ethylene carbonate (EC) in a volume ratio of EC:DEC=70:30. The modified polyether silicone oil including the compound of the following Formula 6 was added in an amount of 10 mass % to prepare an electrolyte of Example 1.

Formula 6

EXAMPLE 2

An electrolyte was prepared according to the same method as in Example 1, except that the polyether modified silicone oil of the following formula 7 was used in an amount of 10 mass %.

Formula 7

EXAMPLE 3

An electrolyte was prepared according to the same method as in Example 1, except that the polyether modified silicone oil of the following Formula 8 was used in an amount of 10 mass %.

Formula 8

EXAMPLE 4

An electrolyte was prepared according to the same method as in Example 1, except that the polyether modified silicone oil of the following Formula 9 was used in an amount of 10 mass %.

Formula 9

COMPARATIVE EXAMPLE 1

An electrolyte was prepared according to the same method as in Example 1, except that the polyether modified silicone oil of the following Formula 10 was used in an amount of 10 mass %.

Formula 10

COMPARATIVE EXAMPLE 2

An electrolyte was prepared according to the same method as in Example 1, except that the polyether modified silicone oil of the following Formula 11 was used in an amount of 10 mass %.

Formula 11

COMPARATIVE EXAMPLE 3

A solution was prepared by mixing $LiPF_6$ in a concentration of 1.3 mol/L with a mixing solvent of diethyl carbonate (DEC) and ethylene carbonate (EC) in a volume ratio of EC:DEC=70:30, and the solution was used as an electrolyte.

Pouch-type rechargeable lithium battery cells were fabricated using the electrolytes according to Examples 1 to 4 and Comparative Examples 1 to 3 as follows.

A positive electrode including $LiCoO_2$ for a positive active material, polyvinylidene fluoride for a binder, carbon black for a conductive agent on an Al foil for a current collector, and a negative electrode including graphite for a negative active material and polyvinylidene fluoride for a binder on a Cu foil current collector, were spirally wound while positioning a polypropylene separator between the positive and negative electrodes. The positive electrode, negative electrode, and separator were inserted into a battery case, and then the electrolytes according to Examples 1 to 4 and Comparative Examples 1 to 3 were injected. The injecting holes of the battery cases were sealed to fabricate the batteries with designed charge and discharge capacity of 820 mAh.

The battery cells were charged at 0.2C to the cut-off voltage of 4.2V under constant current and then charged for 9 hours under constant voltage. Then the battery cells were discharged at 0.2C to the cut-off voltage of 2.75V. Initial discharge capacity of each battery cell was measured. The results are provided in Table 1.

After the battery cells were continuously overcharged at 0.2C for 24 hours, rupture of the battery cells were evaluated. The results are provided in Table 1.

TABLE 1

| | Silicone oil (mass %) | Initial capacity (mAh) | Overcharge test results |
|---|---|---|---|
| Example 1 | 10 | 866 | No rupture |
| Example 2 | 10 | 830 | No rupture |
| Example 3 | 10 | 864 | No rupture |
| Example 4 | 10 | 833 | No rupture |

TABLE 1-continued

|  | Silicone oil (mass %) | Initial capacity (mAh) | Overcharge test results |
|---|---|---|---|
| Comparative Example 1 | 10 | 780 | No rupture |
| Comparative Example 2 | 10 | 782 | No rupture |
| Comparative Example 3 | — | 879 | Rupture |

As shown in Table 1, the rechargeable lithium battery cells including electrolytes according to Examples 1 to 4 show high initial capacity and high safety at overcharge. On the contrary, the battery cells according to Comparative Examples 1 and 2 show lower discharge capacity that those of Examples 1 to 4. The battery cell of Comparative Example 3 shows a good discharge capacity but was ruptured at overcharge to not ensure battery safety.

Figure 2:
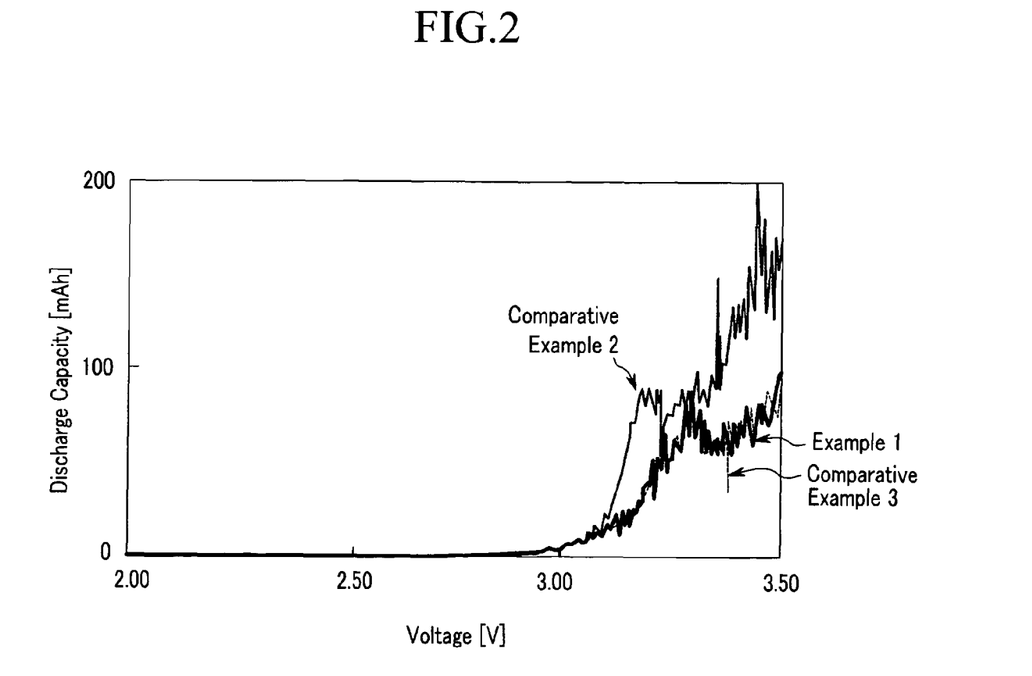
FIG. 2 is a graph showing differential capacity changes relative to a charge voltage of the battery cells including the electrolytes according to Examples 1 and Comparative Examples 2 and 3 during the first charging.

FIG. 2 is a graph showing differential capacity changes relative to a charge voltage of the battery cells including the electrolytes according to Examples 1 and Comparative Examples 2 and 3 during the first charging. The differential capacity is obtained by differentiating measured capacity with a charge voltage. As shown in FIG. 2, the battery cells according to Examples 1 have lower differential capacity compared to that of Comparative Example 2 indicating that electrolyte decomposition was suppressed. These results are caused by the fact that the polysiloxane chains of Examples 1 were longer than that of Comparative Example 2 and thereby decomposition of the silicone oil was suppressed.

Comparing the profiles of Examples 1 and Comparative Example 3, the profiles of Examples 1 are nearly the same as that of Comparative Example 3 that does not include the silicone oil, indicating that electrolyte decomposition in Examples 1 was suppressed to the same degree as in Comparative Example 3.

EXAMPLE 5

A solution was prepared by mixing $LiPF_6$ in a concentration of 1.3 mol/L with a mixing solvent of diethyl carbonate (DEC) and ethylene carbonate (EC) in a volume ratio of EC:DEC=70:30, and the solution was used as an electrolyte. The modified polyether silicone oil of the above Formula 6 and monofluoroethylene carbonate (FEC) were added in an amount of 10 mass % and 5 mass %, respectively, to prepare an electrolyte of Example 5.

Pouch-type rechargeable lithium battery cells were fabricated using the electrolytes according to Examples 5 according to the same method as in Example 1. The battery cells were designed to have a charge and discharge capacity of 820 mAh The battery cells including the electrolytes according to Examples 5 were charged at 0.2C to the cut-off voltage of 4.2V under constant current and then charged for 9 hours under constant voltage. Then the battery cells were discharged at 0.2C to the cut-off voltage of 2.75V. The charge-discharge cycle was repeated twenty times. The discharge capacity at the $20^{th}$ cycle is provided in Table 2 and FIG. 3.

The rechargeable lithium battery cells according to Example 1, and Comparative Example 2 were subjected to the same charge-discharge test as described above. The discharge capacity at the $20^{th}$ cycle is provided in Table 2 and FIG. 3.

TABLE 2

|  | Silicone oil (mass %) | FEC (mass %) | Discharge capacity ($20^{th}$ cycle) (mAh) |
|---|---|---|---|
| Example 1 | 10 | — | 679 |
| Example 5 | 10 | 5 | 741 |
| Comparative Example 2 | 10 | — | 617 |

Figure 3:
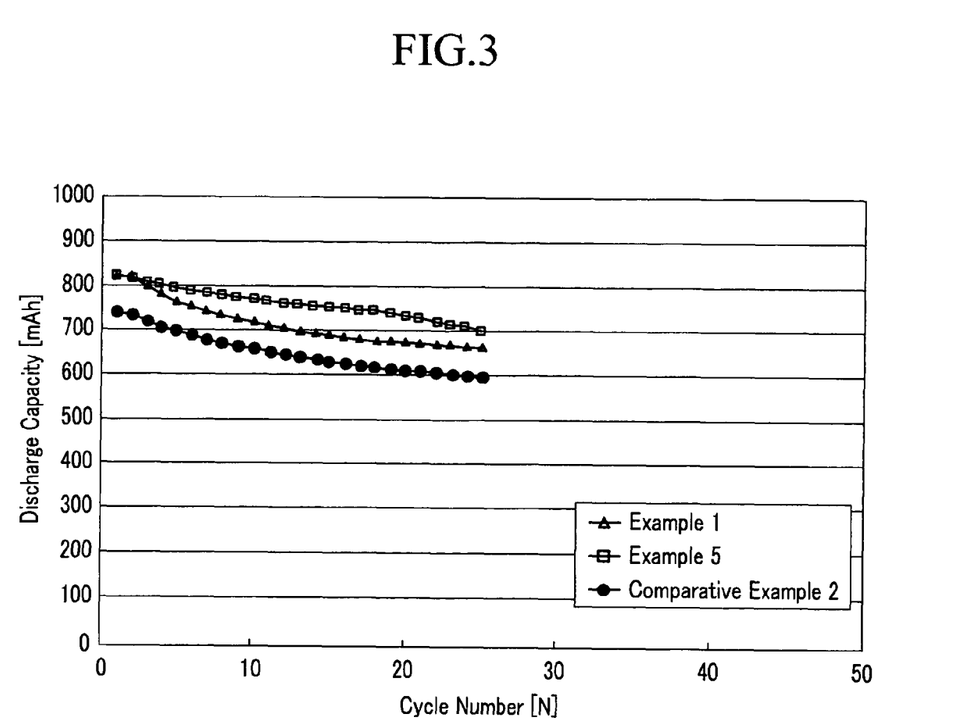
FIG. 3 is a graph showing discharge capacity of the rechargeable lithium battery cells including electrolytes according to Examples 1 and 5 and Comparative Example 2.

As shown in FIG. 3 and Table 2, the rechargeable lithium battery cells including electrolytes according to Examples 1, and 5 show high $20^{th}$ discharge capacities compared to that of Comparative Example 2.

The electrolyte for a rechargeable lithium battery according to one embodiment includes a polyether-modified silicone oil selected from the group consisting of the compounds of the following Formulas 1 to 5, and combinations thereof, which improve thermal stability and ion conductivity of the electrolyte. Accordingly, a rechargeable lithium battery having safety and highly efficient charge and discharge characteristics can be provided. Safety of a battery can also be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrolyte for a rechargeable lithium battery, comprising
   a modified polyether silicone oil comprising at least one selected from the group consisting of the compounds of the following Formulas 3 to 5 and combinations thereof,
   a carbonate, and
   a lithium salt:

where Formula 3 is:

Formula 4 is:

-continued

Formula 5 is:

wherein, in Formulas 3 to 5, k ranges from 1 to 9, l ranges from 1 to 3, n ranges from 1 to 2, R is either of $CH_3$ or $C_6H_5$, z is either of $CH_3$ or $C_2H_5$, and m is 1.

2. The electrolyte of claim 1, which further comprises a carbonate-modified silicone oil.

3. The electrolyte of claim 1, wherein the silicone oil is included in an amount of 1 volume % to 70 volume % based on the total volume of the electrolyte.

4. The electrolyte of claim 3, wherein the silicone oil is included in an amount of 5 volume % to 50 volume % based on the total volume of the electrolyte.

5. The electrolyte of claim 1, wherein the silicone oil has a flash point of more than or equal to 120° C.

6. The electrolyte of claim 1, wherein the carbonate is selected from the group consisting of cyclic carbonates, linear carbonates, and combinations thereof.

7. The electrolyte of claim 6, wherein the cyclic carbonate is included in an amount of 30 to 95 volume % based on the total volume of the electrolyte.

8. The electrolyte of claim 7, wherein the cyclic carbonate is included in an amount of 50 to 90 volume % based on the total volume of the electrolyte.

9. The electrolyte of claim 6, wherein the linear carbonate is included in an amount of 5 to 70 volume % based on the total volume of the electrolyte.

10. The electrolyte of claim 9, wherein the linear carbonate is included in an amount of 10 to 65 volume % based on the total volume of the electrolyte.

11. The electrolyte of claim 6, wherein the cyclic carbonate is a fluorinated cyclic carbonate.

12. The electrolyte of claim 11, wherein the fluorinated cyclic carbonate is included in an amount of 0.1 to 25 volume % based on the total volume of the electrolyte.

13. The electrolyte of claim 12, wherein the fluorinated cyclic carbonate is included in an amount of 0.5 to 10 volume % based on the total volume of the electrolyte.

14. The electrolyte of claim 1, which further comprises fluoroethylene carbonate (FEC).

15. The electrolyte of claim 1, wherein the lithium salt comprises at least one selected from the group consisting of $LiPF_6$, $LiBF_4$, $Li[N(SO_2C_2F_6)_2]$, $Li[B(OCOCF_3)_4]$, $Li[B(OCOC_2F_5)_4]$, $LiPF_6$, $Li[N(SO_2C_2F_5)_2]$, and combinations thereof.

16. The electrolyte of claim 1, wherein the lithium salt is included at a concentration of 0.5 to 2.0 mol/L.

17. A rechargeable lithium battery comprising:
a positive electrode;
a negative electrode;
an electrolyte comprising
a modified polyether silicone oil comprising at least one selected from the group consisting of the compounds of the following Formulas 3 to 5, and combinations thereof;
a carbonate; and
a lithium salt, where Formula 3 is:

Formula 4 is:

Formula 5 is:

wherein, in Formulas 3 to 5, k ranges from 1 to 9, l ranges from 1 to 3, n ranges from 1 to 2, R is either of $CH_3$ or $C_6H_5$, z is either of $CH_3$ or $C_2H_5$, and m is 1.

18. The rechargeable lithium battery of claim 17, wherein the electrolyte further comprises a carbonate modified silicone oil.

19. The rechargeable lithium battery of claim 17, wherein the silicone oil is included in an amount of 1 volume % to 70 volume % based on the total volume of the electrolyte.

20. The rechargeable lithium battery of claim 19, wherein the silicone oil is included in an amount of 5 volume % to 50 volume % based on the total volume of the electrolyte.

21. The rechargeable lithium battery of claim 17, wherein the silicone oil has a flash point of more than or equal to 120° C.

22. The rechargeable lithium battery of claim 17, wherein the carbonate is selected from the group consisting of cyclic carbonates, linear carbonates, and combinations thereof 23. The rechargeable lithium battery of claim 22, wherein the cyclic carbonate is included in an amount of 30 to 95 volume % based on the total volume of the electrolyte.

24. The rechargeable lithium battery of claim 23, wherein the cyclic carbonate is included in an amount of 50 to 90 volume % based on the total volume of the electrolyte.

25. The rechargeable lithium battery of claim 22, wherein the linear carbonate is included in an amount of 5 to 70 volume % based on the total volume of the electrolyte.

26. The rechargeable lithium battery of claim 25, wherein the linear carbonate is included in an amount of 10 to 65 volume % based on the total volume of the electrolyte.

27. The rechargeable lithium battery of claim 22, wherein the cyclic carbonate is a fluorinated cyclic carbonate.

28. The rechargeable lithium battery of claim 27, wherein the fluorinated cyclic carbonate is included in an amount of 0.1 to 25 volume % based on the total volume of the electrolyte.

29. The rechargeable lithium battery of claim 28, wherein the fluorinated cyclic carbonate is included in an amount of 0.5 to 10 volume % based on the total volume of the electrolyte.

30. The rechargeable lithium battery of claim 17, wherein the electrolyte further comprises fluoroethylene carbonate (FEC).

31. The rechargeable lithium battery of claim 17, wherein the lithium salt comprises at least one selected from the group consisting of $LiPF_6$, $LiBF_4$, $Li[N(SO_2C_2F_6)_2]$, $Li[B(OCOCF_3)_4]$, $Li[B(OCOC_2F_5)_4]$, $LiPF_6$, $Li[N(SO_2C_2F_5)_2]$, and combinations thereof.

32. The rechargeable lithium battery of claim 17, wherein the lithium salt is included at a concentration of 0.5 to 2.0 mol/L.

33. The electrolyte of claim 1, the modified polyether silicone oil comprising a compound of formula 3.

34. The electrolyte of claim 1, the modified polyether silicone oil comprising a compound of formula 4.

35. The electrolyte of claim 1, the modified polyether silicone oil comprising a compound of formula 5.

* * * * *